United States Patent

[11] 3,533,482

| [72] | Inventor | Walton W. Cushman |
| | | Webb City, Missouri |
| [21] | Appl. No. | 684,141 |
| [22] | Filed | Nov. 20, 1967 |
| [45] | Patented | Oct. 13, 1970 |
| [73] | Assignee | Martin Tucker |
| | | New York, New York |
| | | Trustee |

[54] CIRCUMFERENTIALLY LOADED AND SNUBBERED HUBLESS WHEEL SURFACE LOCOMOTION APPARATUS
32 Claims, 37 Drawing Figs.

[52] U.S. Cl. ............................................. 180/9.2,
115/1, 180/9.5, 305/11, 305/20, 305/35
[51] Int. Cl. ............................................. B62d 55/08,
B62d 55/24
[50] Field of Search ............................................. 305/35, 20,
34, 38; 280/28.5; 74/(Consulted exr); 180/9.2, 9.5

[56] References Cited
UNITED STATES PATENTS

| 3,107,924 | 10/1963 | Cushman | 305/20X |
| 3,276,823 | 10/1966 | Tucker | 305/11 |
| 1,401,949 | 1/1922 | Anderson | 305/20X |
| 1,516,578 | 11/1924 | Platt | 305/20X |
| 2,665,175 | 1/1954 | Miller | 305/35X |
| 2,734,476 | 2/1956 | Marsh | 305/34X |
| 3,443,654 | 5/1969 | Schoonover | 180/9.62 |
| 3,447,620 | 6/1969 | Schoonover | 180/9.64 |

*Primary Examiner*—Richard J. Johnson
*Attorney*—Lon H. Romanski

ABSTRACT: An ultra lightweight and efficient load-bearing, suspension and surface locomotion apparatus having an exceptionally large footprint adapted for both on and off the road vehicles and comprising an improved multiple belt and circumferentially loaded hubless wheel arrangement, with or without a tread belt, wherein separate suspension components such as springs, shock absorbers and torsion arms associated with conventional wheeled or tracked vehicles are not required, the apparatus having the highly desirable capability of "dynamic lift" not heretofore displayed by conventional surface locomotion apparatus, and including a variety of improvements such as means providing constraint against detracking, hermetic sealing against the entry of debris or other foreign matter, lateral pivotability to accommodate terrain contour variation, and numerous other novel features.

Patented Oct. 13, 1970
3,533,482
Sheet 1 of 5
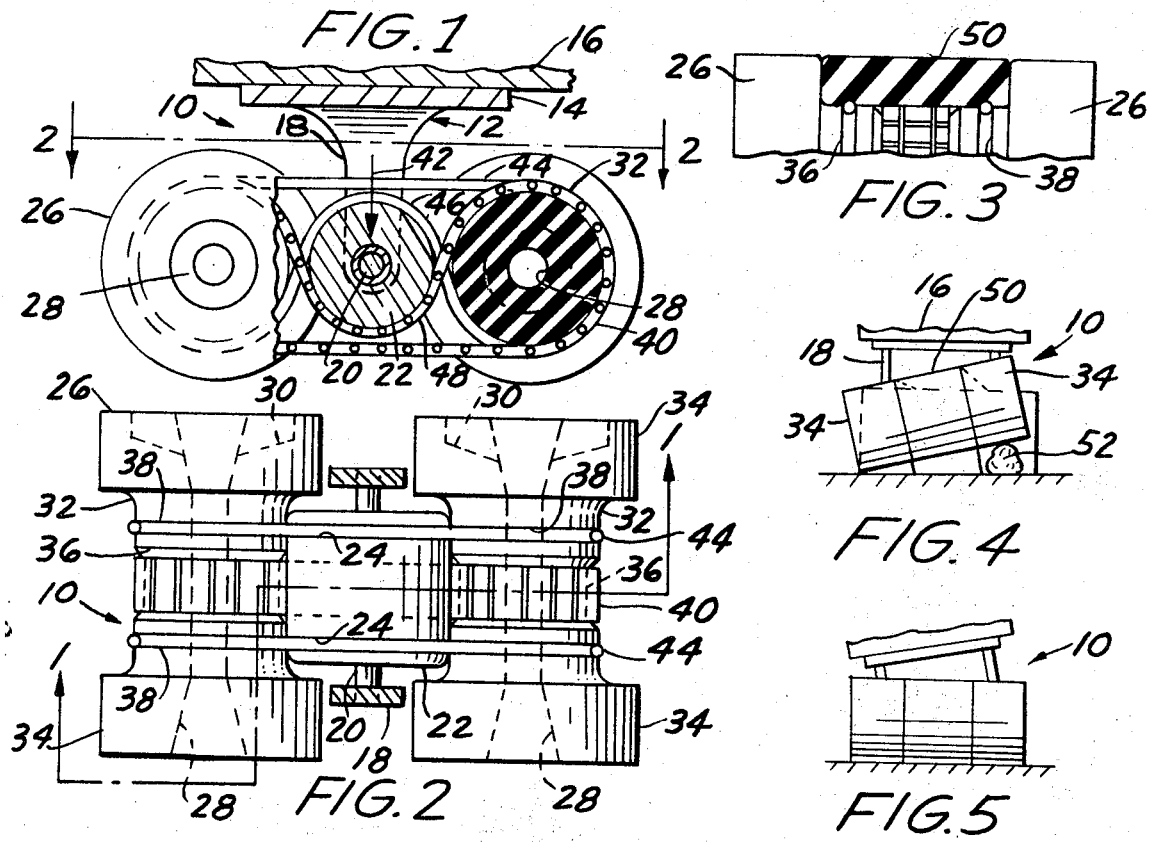
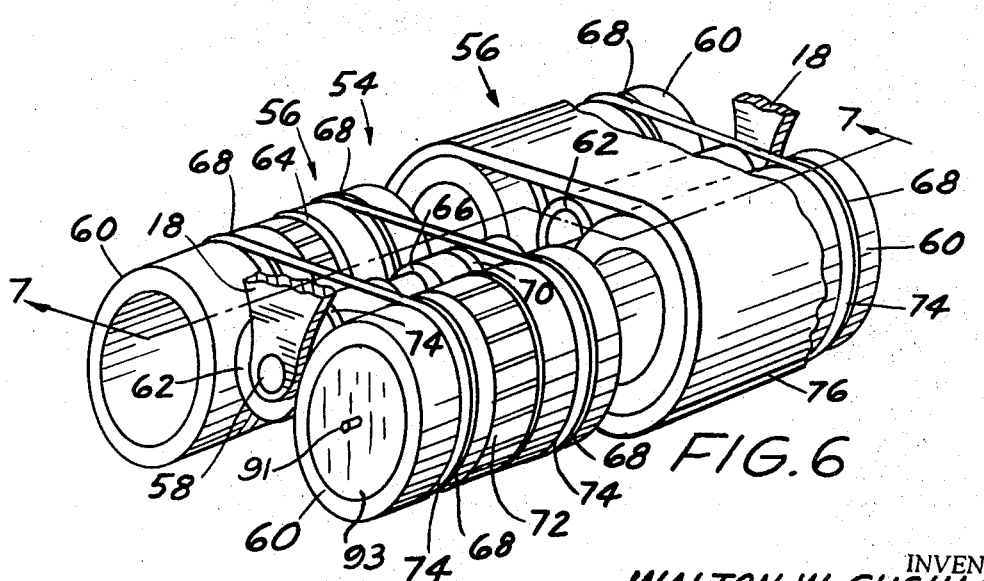
INVENTOR.
WALTON W. CUSHMAN
BY
Walter Patarska, Jr.
ATTORNEY Patented Oct. 13, 1970
3,533,482
Sheet 2 of 5
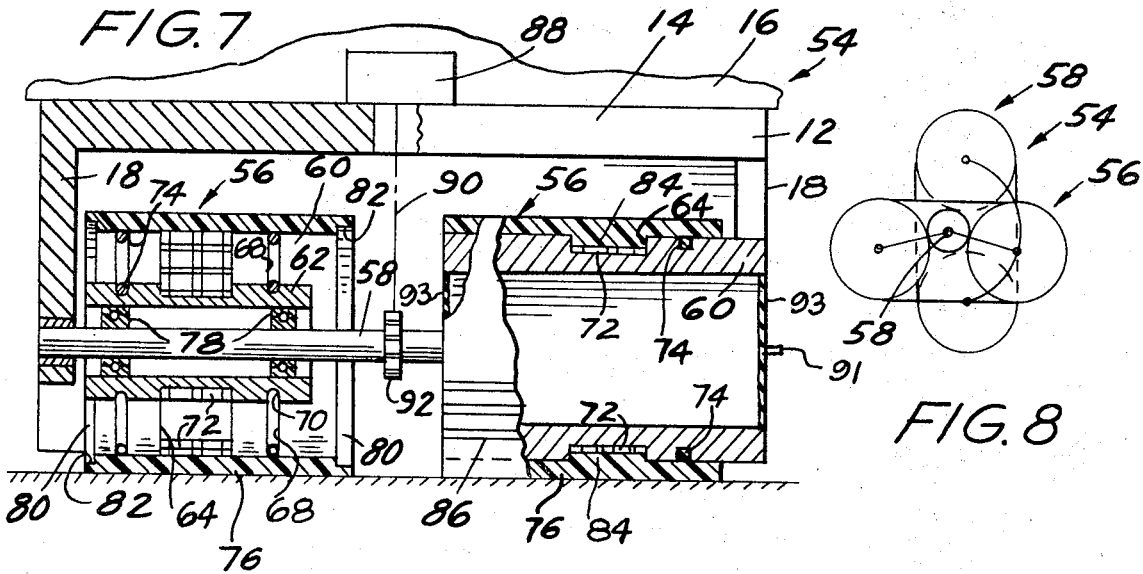
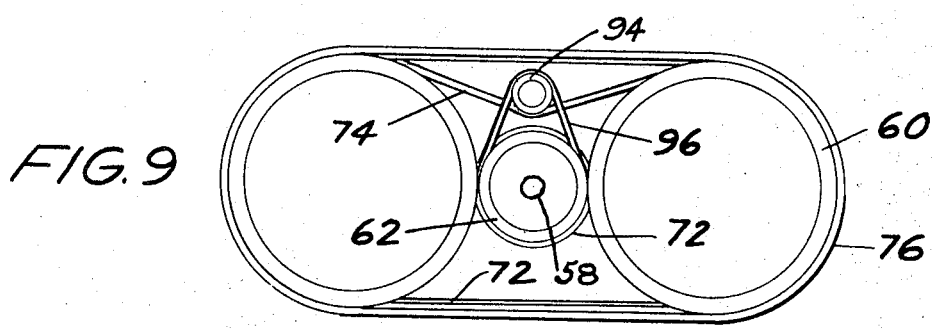
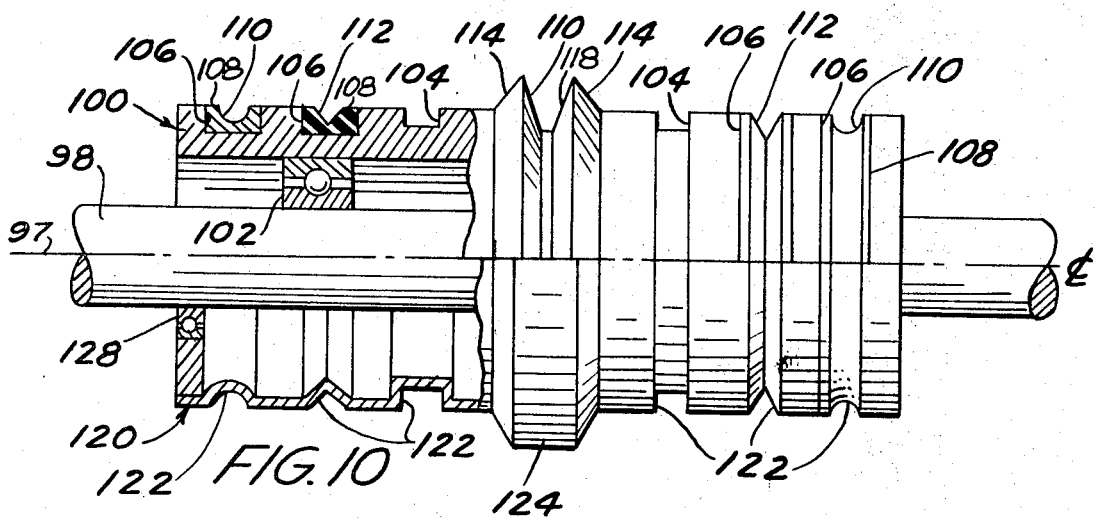
INVENTOR.
WALTON W. CUSHMAN
BY
Walter Patoraka, Jr
ATTORNEY

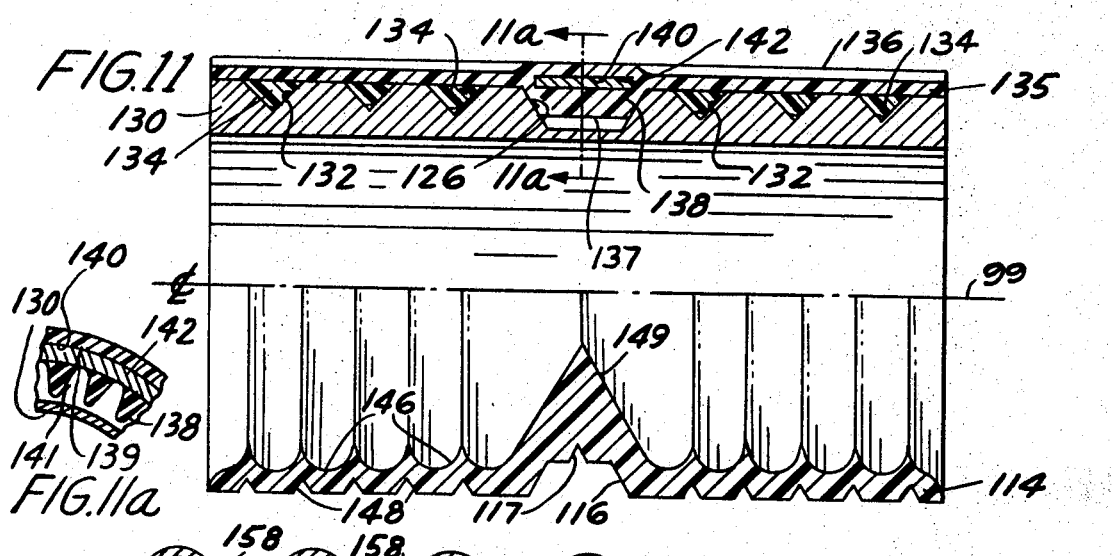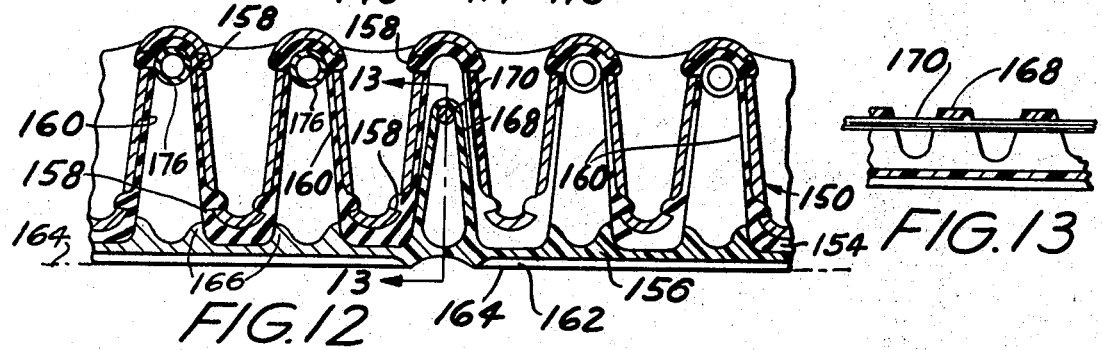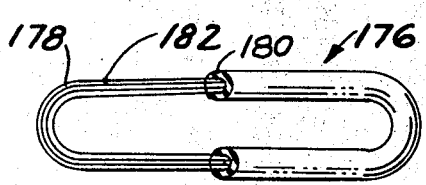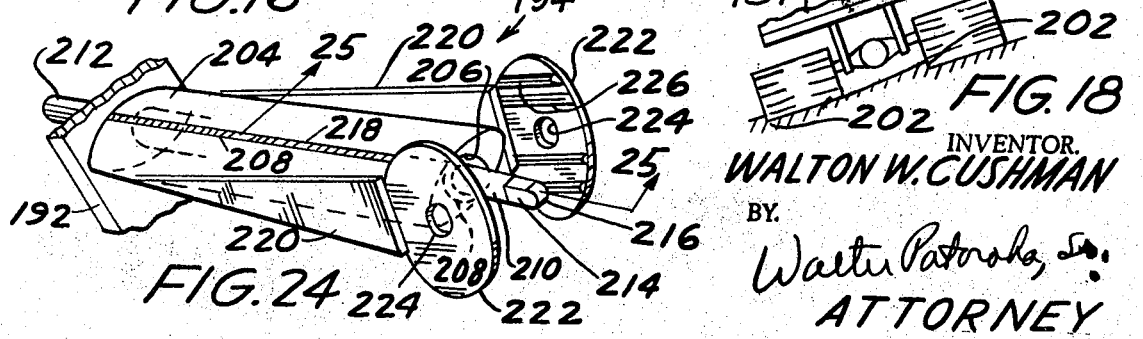

WALTON W. CUSHMAN
INVENTOR.

BY Walter Patroha, Jr.
ATTORNEY

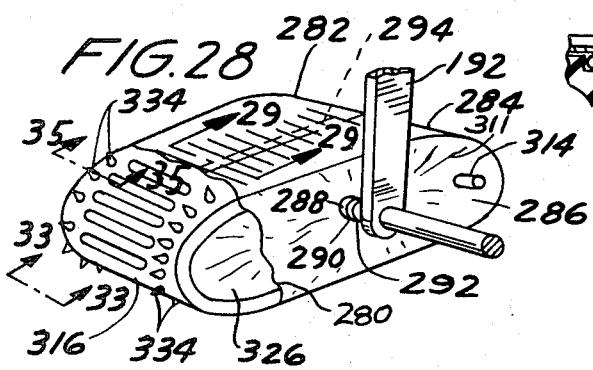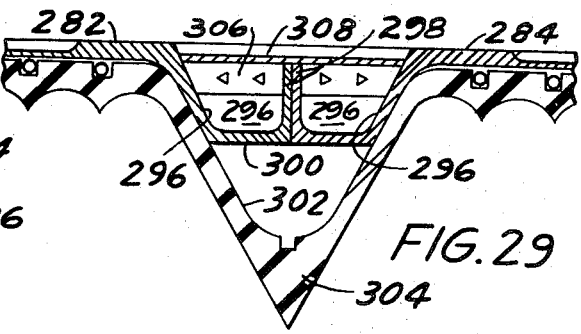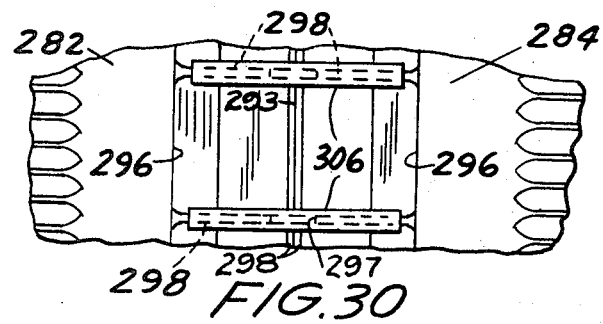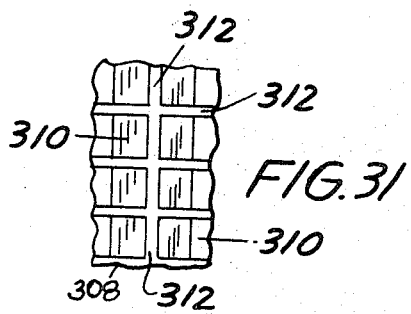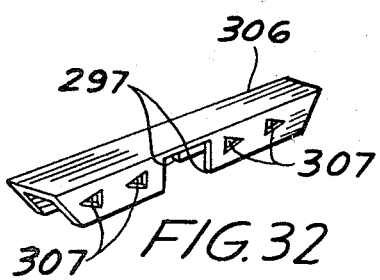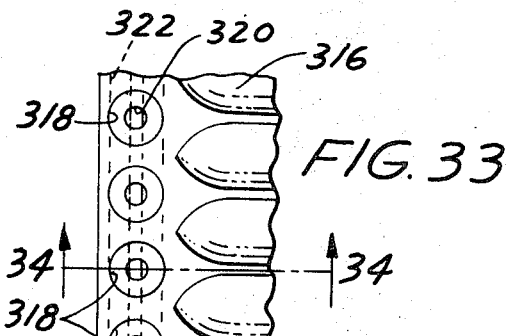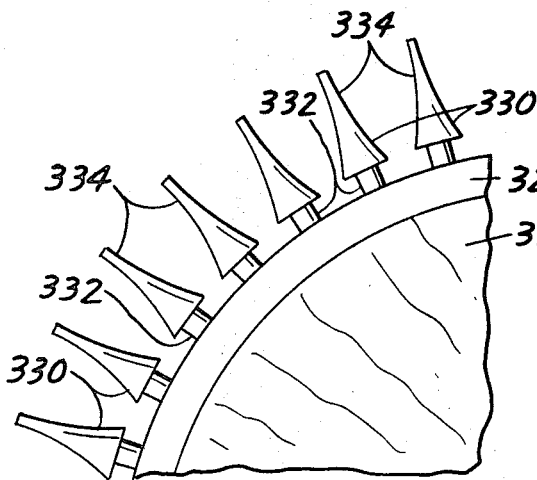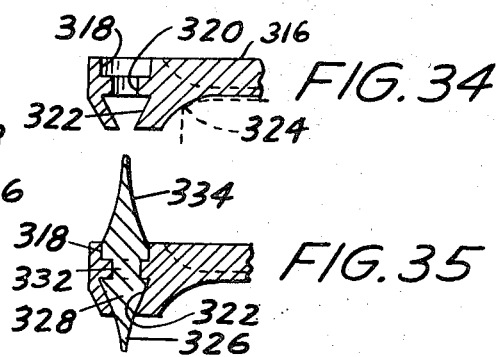

CIRCUMFERENTIALLY LOADED AND SNUBBERED HUBLESS WHEEL SURFACE LOCOMOTION APPARATUS

BRIEF SUMMARY OF THE INVENTION

This invention relates generally to surface locomotion apparatus, and more particularly to improved apparatus especially adapted as a substitute for conventional wheel and/or endless track means in vehicular suspension and locomotion systems.

My earlier U.S. Pat. No. 3,107,924, entitled "Load-bearing and Transporting Means Constituting Wheel and Endless Track substitute" and dated Oct. 22, 1963, discloses a basic locomotion apparatus utilizing circumferentially loaded hubless wheels to provide an ultra lightweight and efficient load-bearing surface locomotion means with an inherent shock absorbing suspension capability.

In this earlier basic disclosure it was shown that the essential functions of shock absorbtion and compensation for irregular terrain in a vehicle suspension system could be effectively combined with or incorporated into the vehicle's surface locomotion apparatus so that all of these previously distinctly separate functions were obtainable from only the one form of apparatus. As contrasted with conventional vehicle constructions wherein the wheels, springs, and shock absorbers of wheeled vehicles, or the tracks, road wheels, and torsion arms of tracked vehicles, are all separate components, the construction disclosed in U.S. Pat. No. 3,107,924 successfully combined all of these functions, and more, into one apparatus with all of the favorable attributes of both tracked and wheeled vehicle structures, but with none of the significant faults or disadvantages of either. Such vast savings in weight were displayed that this is by far the lightest known form of vehicle suspension and surface locomotion apparatus, and ultimate static load capacities in excess of 2000 times its own weight are presently feasible and have been constructed, as contrasted with many existing conventional track constructions which can support only 3 to 4 times their own weight.

While my above mentioned prior patent disclosed the basic locomotion apparatus, it did not disclose structure having important features such as reaction snubbing, dynamic lift, tracking alignment, pivotability and sealing against entry of foreign matter, for example. Accordingly, a main object of this invention is to provide certain novel improvements and refinements in the basic structure, some of which may be desirable or essential to preferred embodiments of the improved apparatus and others of which may be optional, depending upon the application.

More specifically, some of these novel improvements and refinements contemplated by the invention are as follows:

A. Integrated suspension and friction drive locomotion apparatus including both direct rolling friction and belted type friction;

B. Circumferential loading and reaction snubbing, with augmentation tensioning, to enhance maximum propulsion and/or for braking;

C. Improved load and snubber belt constructions;

D. Lighter weight hubless wheel constructions, with improved deformation capability, integral tracking means and replaceable or alternate pulley grooves;

E. Improved load hub construction with cooperating integral tracking means and replaceable or alternate pulley grooves;

F. Improved tread belt constructions and means for constraint against detracking;

G. Means for hermetic sealing of track-like locomotion apparatus against entry of harmful foreign matter;

H. Enclosed ballast and/or flotation means;

I. Suspension means having initially low and rapidly increasing spring rate approaching the "hoop" effect;

J. Terrain sensing means due to structural features such as longitudinal twistability, lateral pivotability, recessed load belts, free flexing tread belt and flexing hubless wheels;

K. A highly desirable and novel performance phenomenon in surface locomotion apparatus know as "dynamic lift."

These and numerous other objects and advantages of the invention will become more apparent upon reference to the following Detailed Description and the attached drawings. In the description that follows, like elements bear the same reference numerals, and any combination of a load hub, hubless wheels and belts, with or without a tread belt, will, for convenience, unless otherwise specifically named, be termed or referred to as "apparatus."

BRIEF DESCRIPTION OF THE VARIOUS VIEWS OF THE DRAWINGS

FIG. 1 is a side elevational view, with a portion thereof cut away and in cross section, substantially along the plane of line 1—1 of FIG. 2 and looking in the direction of the arrows, of an industrial caster embodying the invention;

FIG. 2 is a top plan view of the caster shown in FIG. 1, as seen from the plane of line 2—2 of FIG. 1 and looking in the direction of the arrows;

FIG. 3 is a fragmentary portion of FIG. 2 showing the use of a tread belt;

FIGS. 4 and 5 are schematic views illustrating certain capabilities of the caster shown by FIGS. 1—3;

FIG. 6 is a perspective view of a dual apparatus configuration of the invention, with and without an optional tread belt;

FIG. 7 is a cross-sectional view, taken on the plane of line 7—7 of FIG. 6 and looking in the direction of the arrows, illustrating possible modifications;

FIG. 8 is a schematic illustration of a functional capability of the structure shown by FIGS. 6 and 7;

FIG. 9 is a schematic view illustrating a belt augmentation tensioning structure particularly adapted for certain heavy load applications of the invention;

FIG. 10 is a schematic view, with portions thereof cut away and in cross section, illustrating alternate main load hub constructions on opposite sides of a common centerline;

FIG. 11 is a schematic cross-sectional view, taken on a plane through the longitudinal axis of a hubless wheel element, illustrating alternate constructions on opposite sides of the common centerline, the upper portion also illustrating a constrained tread belt structure;

FIG. 11a is a fragmentary cross-sectional view taken on the plane of line 11a—11a of FIG. 11, looking in the direction of the arrows;

FIG. 12 is a fragmentary cross-sectional view illustrating an alternate hubless wheel and constrained tread belt construction;

FIG. 13 is a fragmentary cross-sectional view, taken along the plane of line 13—13 of FIG. 12 and looking in the direction of the arrows;

FIG. 14 is a schematic elevational view, with the tread belt cut away, illustrating a functional characteristic of the hubless wheel construction shown by FIG. 12;

FIG. 15 is a schematic, perspective illustration, partly in cross section, of a double V-belt particularly suited for use as a load or snubber belt in apparatus embodying the invention;

FIG. 16 is a perspective illustration, with a portion thereof cut away, of an elastomer-lagged, endless cable suited for use as a load or snubber belt;

FIGS. 17 and 18 are schematic illustrations of the sloped terrain capabilites of vehicles having laterally pivotable locomotion apparatus embodying the invention;

Figure 25:
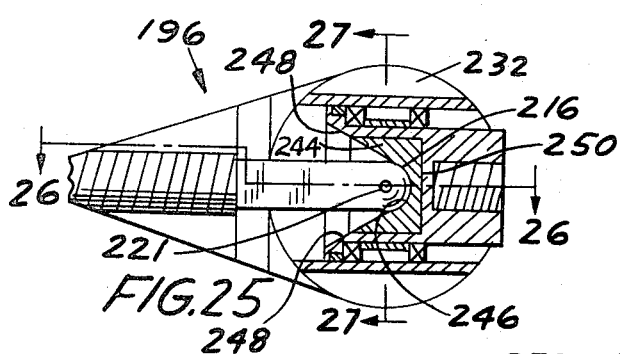
Figure 27:
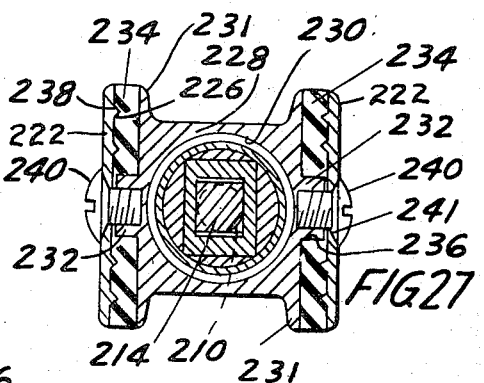
Figure 26:
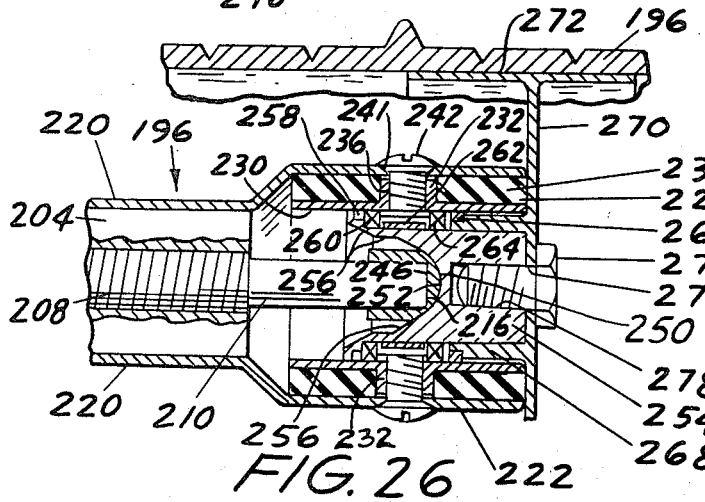

FIGS. 19—23 are simple schematic illustrations of stability, dynamic lift and obstacle negotiating capabilities of the invention;

FIG. 24 is an enlarged fragmentary perspective view, with portions thereof removed to better illustrate the structure, of the laterally pivotable hub drive structure shown schematically in the right-hand portion of FIG. 17;

FIG. 25 is a vertical cross-sectional view of the pivotable load hub mounting structure, taken through the center thereof on the plane of line 25–25 of FIG. 24 and looking in the direction of the arrows;

FIG. 26 is a cross-sectional view taken through the pivot point on the plane of line 26–26 of FIG. 25, looking in the direction of the arrows;

FIG. 27 is a cross-sectional view taken on the plane of line 27–27 of FIG. 25, looking in the direction of the arrows;

FIG. 28 is a perspective view of vehicle locomotion apparatus embodying the invention and illustrating, in the single view, alternate means for sealing the same against the entry of foreign materials;

FIG. 29 is an enlarged fragmentary cross-sectional view taken on the plane of line 29–29 of FIG. 28, illustrating in greater detail one of the alternate sealing methods;

FIG. 30 is a top plan view of FIG. 29, with an element removed to expose structure thereunder;

FIG. 31 is a reduced fragmentary view of the inner surface of the element removed from FIG. 30;

FIG. 32 is an enlarged perspective view of an attaching means shown in FIGS. 29 and 30;

FIG. 33 is a fragmentary plan view of the tread belt portion employed in the other alternate sealing means shown to the left of the broken line in FIG. 28, as viewed from line 33–33 of FIG. 28;

FIG. 34 is a cross-sectional view taken on the plane of line 34–34 of FIG. 33;

FIG. 35 is a fragmentary cross-sectional view taken on the plane of line 35–35 of FIG. 28; and FIG. 36 is a fragmentary elevational view of the track closure sealing element shown at the left in FIG. 28.

DETAILED DESCRIPTION

Referring now to the drawings in greater detail, FIGS. 1—5 illustrate the structure and capability of apparatus embodying the invention and particularly adapted for, although not limited to, use as an industrial caster.

The caster 10 includes any suitable mounting bracket 12 having an upper member 14 for attachment to a truck or platform 16 and spaced depending members 18 in which the ends of the shaft 20 passing through a cylindrical main load hub roller element 22 are fixed, or journaled on bearings in any suitable manner. In his case, the hub 22 is shown as a steel cylinder having spaced annular snubber belt grooves 24 but, as will be seen, it may take other forms.

Hubless wheel roller elements 26, which may be identical in construction, are disposed on opposite sides of the main load hub 22, with their axes normally parallel to that of the hub. The hubless wheels 26, are, in this caster application, machined, cast, or otherwise formed, from a tough, wear-resistant semirigid elastomer, with an axial passage 28 (a more resilient alternate structure being shown by the dotted lines 30) and a main circumferential hub tracking groove 32 between the end running or tread surfaces 34, the base of the groove 32 having a central annular load belt groove 36 and spaced snubber belt grooves 38 identical in section to the grooves 24 in the main load hub 22.

The caster apparatus 10 shown is assembled simply by placing a suitable link type, endless load chain 40 in the grooves 36, the chain circumference being such that when the main load hub 22 is placed on the top run thereof, the elements assume the position shown in FIGS. 1 and 2. That is, the hub 22 and the chain 40 stressed in tension transfer the vertical truck or vehicle load represented by the arrow 42 to circumferentially or peripherally-applied loads shared by the hubless wheels 26, the greater the vertical load 42, the greater the circumferential loads, and thus the greater the frictional engagement between the chain 40 and the hubless wheels 26. An endless snubbing or tensioning belt 44, which may be formed from a helical spring or a yieldable elastomer with good recovery properties, or which may be relatively inelastic, is assembled in each of the grooves 38, the belts providing the means whereby the apparatus 10 is held together, particularly when not under load, it being noted that the bottom run 46 of the belts 44 pass over the top of the main load hub 22, while the top run 48 of the chain upwardly supports the main load hub 22. By "hubless" it is, of course, meant that the operation of or the load carrying capabilities of the wheels or roller elements 26 is not dependent upon the existance of a centrally disposed axle, functioning as a hub about which such wheels 26 respectively revolve.

The caster 10 will normally not be self-propelled, although it could be made so by providing means to drive the hub 22. As shown in FIGS. 3—5, where additional footprint area is desired or where additional protection is required for the chain 40 against any foreign matter that may be encountered on the floor or other surface over which the caster is operated, a flexible endless tread belt 50 formed from a durable elastomer or other suitable material may be positioned in the main tracking groove 32.

FIGS. 4 and 5 illustrate capabilites of the caster apparatus 10. Due to some freedom of movement of the hub 22 in the main grooves 32 and the flexibility of the belts 44 and the twistability of the chain 40, and of any tread belt 50 that may be employed, the hubless wheels 34 can react independently when negotiating obstacles 52, as shown in FIG. 4, or the axes of the hubless surface locomotion wheels 26 can be displaced, with reference to each other, to assume limited nonparallel relationships in all directions, as well as with reference to the axis of the hub 22, without loss of rolling integrity. This feature is also enhanced by the fact that the recessed support elements 18 are formed (see FIG. 1) so as to provide a clearance with the rolling surfaces 34 of the hubless wheels, thus allowing more freedom of movement.

Depending upon the structure and composition of the hubless wheel elements 26, and the loads supported, a wide range of design flexibility is provided so that the apparatus constitutes a combined load-bearing suspension and surface locomotion system. If desired, the load belt-engaging surface of the hub 22 and/or the surface locomotion rollers or wheels 26 may be hardened or otherwise formed or treated for wear resistance. While no limitation is intended herein as to the dimensions of the elements, or the particular materials employed, it should be apparent that the apparatus 10 is constructed so as to permit the employment of a broad variety of materials, depending upon the application intended. It should also be noted that with the chain 40, which could also be a reinforced elastomer belt, the hub 22 and the tread belt 50 each disposed in the same hubless wheel element grooves 32, self-tracking and restraint against detracking features are provided.

FIGS. 6—8 illustrate modifications of the apparatus 10 shown by FIGS. 1—5, wherein, as previously stated, elements common to both structures bear the same reference numerals.

In this configuration, the dual apparatus 54 includes the bracket 12 which spans a pair of hubless wheel assemblies 56 having a common load hub shaft 58 journaled in the depending members 18. As in the case of the FIG. 1—5 construction, the surface locomotion wheel elements 60 and the hub 62 may be constructed from any suitable material and with grooves 64 and 66 and 68 and 70 receiving the load belt or chain 72 and the tensioning belts 74, respectively. These grooves may be sufficiently deep so that the chain and tensioning belts are recessed from the spaced outer circumferential rolling or tread surfaces of the hubless wheels, which would be desirable where these surfaces would roll on the floor, road or ground, without a tread belt as shown in the left-hand portion of FIG. 6. Alternatively, a tread belt 76 of any suitable material could be provided, as in the right-hand portion of FIG. 6, and in FIG. 7. The load hubs 62 may be shortened or recessed at the outer ends thereof so that the members 18 do not extend beyond the outer ends of the hubless wheels 60.

Referring now to FIG. 7, the hubs 62 may be mounted on bearings 78 so as to be longitudinally pivotable on the shaft 58, providing independent positional and obstacle-negotiating-capability, as between the two paired but separate hubless wheel assemblies 56, as shown by FIG. 8. FIG. 7 also illustrates alternate tread belt retaining structures, the left-hand structure comprising hubless wheel end flanges 80 engaged in a recess 82 in tread belt 76, and the right-hand structure comprising a tread belt flange 84 engaged in the hubless wheel load belt groove 64. The tread belts 76 may be narrower than the hubless wheels 60 to permit the members 18 to be positioned between the hubless wheels, and they may be provided with lateral traction elements, as at 86.

FIG. 7 also illustrates that the bracket 12 may, in fact, comprise a vehicle chassis having a power unit 88 for driving the shaft or axle 58, as by a chain drive 90 for the gear 92 fixed on the axle, providing a self-propelled apparatus, wherein the hub bearings 78 may be eliminated and the shaft secured directly to the hub 62.

FIGS. 6 and 7 further illustrate other useful features of the invention, internal ballast and/or flotation means that is obtained without adding to the size of the apparatus. As seen in the nearest hubless wheel in FIG. 6 and the right-hand hubless wheel in FIG. 7, any or all of the hollow hubless wheels may have the ends thereof closed in any desired manner by a wall 93, which is not necessarily but preferably a flexible wall so as not to restrict deformation of the hubless wheels in circularity. The wall 93 and its means of attachment to the hubless wheels may, for example, be similar to the end closure member 17 disclosed in my U.S. Pat. No. 3,006,396. The resulting sealed chamber 95 may be filled with sand, water or other ballast, or it may be filled with air or lightweight foam to increase flotation of the apparatus for traversing water. Where the attachment of the wall 93 to the hubless wheels 60 is sealed, a valve 91 may be provided for such purposes.

Apparatus for lighter load applications employ one or more tensioning or load force augmenting belts, which are elastic to take up any slack resulting from the elastic deformation of the tubular hubless wheel elements under load, plus any small amounts of elastic elongation in the load belts. In industrial caster applications for use in foundries, etc., where hot or sharp bits of metal may be encountered, the elastic snubber belts may be made from endless hilical springs (not shown) such as were once commonly used to drive moving picture projectors and the like. However, where high temperatures or sharp objects are not normally encountered, the tensioning belts may be made from any of the good quality elastomers with high recovery capabilities.

FIG. 9 illustrates schematically an improvement specially adapted for substantially heavier load applications of the apparatus. Such applications may, for example, require an additional load force augmentation tensioning apparatus, such as the extra multiple pulley 94, which may be either axially fixed or movable, and belts 96. This is particularly desirable where it is required that the tensioning belts 74 be relatively inelastic so that they may contribute substantially to the development of maximum propulsive or braking forces as in self-propelled apparatus, for example, and it greatly simplifies assembly and permits the tensioning and load belts to be identical and interchangeable. Because the top runs of the snubber belts 74 act as a true catenary, the augmentation force required for tensioning, which may be varied by providing means to reposition the pulley 94, is relatively small. The augmentation tensioning belts 96 may be highly elastic or relatively inelastic, depending upon the results desired.

Reviewing briefly the structures of FIGS. 1—9, it will be appreciated that operation of the apparatus involves two principle types of frictional forces, one being the direct engagement rolling friction between the main hub roller 22 or 62 and each of the surface locomotion wheels 26 or 60, and the other being the belted friction of the load and load augmenting or tensioning belts 40 and 44 or 72 and 74. The wrap of each of the belts on the main load hub may be in excess of 180°, and in excess of 270° on the surface locomotion wheels, depending upon the relative circumferential length of the respective load and snubbing or tensioning belts. However, regardless of the load belt circumference, the downward force of the suspended load acting through the load belt causes each of the surface locomotion wheels to be forced into direct rolling engagement with the main load hub, under a force of up to one half of the suspended load, which can be substantial. It will be apparent that the rolling friction increases with the load.

It will be noted further that while no single belt completely encircles any single surface locomotion wheel, the opposite application of the load and tensioning belts, both under and over the load hub, results in the application of circumferential loading and/or snubbing substantially a full 360° around the surface locomotion wheels. In fact, for each combination of one load and one load force augmenting belt, there is on the order of 540° of total circumferential loading and snubbing on each surface locomotion wheel. The action of the tensioning or load-augmenting belts on the surface locomotion wheels, in opposition to the action of the load belts, is referred to herein as "reaction" snubbing or tensioning, and, upon increasing loads or impact, it may approach or reach "hoop" effect proportions, particularly where augmentation tensioning of the snubber belts is employed. This hoop effect increases the circular rididity of the surface locomotion wheel elements, which, in turn, increases their spring rate.

Careful examination of my earlier patent will reveal that many of the important novel structural and functional features discussed above in connection with FIGS. 1—9 herein, such as reaction snubbing, hoop effect, augmentation snubber belt tensioning, spaced-belt loading and snubbing permitting twistability, ballasting and flotation means, grooved load hub, and surface locomotion wheel constructions permitting operation without a tread belt, and the like, are not taught by my prior patent disclosing a basic novel concept in surface locomotion apparatus.

FIG. 10 illustrates additional novel improvements and refinements in load hub construction, and it should be considered, in some respects, along with FIG. 11 illustrating improvements and refinements in hubless surface locomotion wheel construction, since the load hub is in rolling engagements with the hubless surface locomotion wheels. It should be noted that FIGS. 10 and 11 illustrate optional alternate constructions on opposite sides of the horizontal centerlines thereof.

In FIG. 10, the centerline 97 runs through the shaft 98, which, in the upper half of the FIG., is rotationally mounted along the axis of the machined or cast hub 100 by one or more suitable bearings 102. It will be noted that the outer periphery of the hub 100 is formed with alternate design belt (load and/or snubber) grooves. Groove 104 may be of any desired shape and formed in the hub for use as formed. Grooves 106 are formed in any desired depth or shape, suited to receive pulley groove insert rings 108 having formed therein any desired pulley groove, for example the round groove 110 or the V-belt groove 112. Such pulley groove insert structures are particularly advantageous in applications where it may be desired to vary or change the load or snubber belt configuration so as to provide a broad range of performance capabilities with a minimum number of "standard" load hubs. Also, in the event that the hub 100 or its mating hubless wheels are damaged or become worn in the area of the groove, it will not be necessary to replace the hub or hubless wheels, but only the insert ring 108.

The upper portion of FIG. 10 also illustrates a "double" or pulleyed main tracking flange 114, which is provided and adapted for rolling engagement in the main tracking groove 116 of the hubless wheel element shown in the bottom half of FIG. 11. As is apparent from the structures thus far described, and as will be further described below, the load hub rolls between a pair of hubless wheel elements, but not on the surface being traversed, and a self-tracking feature may be provided by a hub main tracking flange, such as flange 114 in FIG. 10, engaged in a hubless wheel tracking groove, such as 116 shown in FIG. 11. The double flange 114 also automatically provides a groove 118 for a central snubber belt or cable, in the event only one is required, the remaining grooves then being used for load belts.

The alternate structure for hub 120, shown below the centerline in FIG. 10, may be formed by rolling a relatively thin-walled sheet or tube, the use of which enables an overall ultra lightweight apparatus construction made possible by the circumferential loading principle. The belt grooves 122 may be rolled, and pulley groove inserts, which may also add rigidity, may be employed, as previously described, it being noted that the alternate nonpulleyed tracking flange 124 is intended for engagement in the single tracking groove 126 in FIG. 11, in which event two or more of the pulley grooves 122 would be used for snubber belts. The bearings 128 between the shaft 98 and the hub 120 may in this case be disposed at the ends of the hub 120.

Referring to FIG. 11, that portion above the centerline illustrates a hubless wheel 130 having three V-belt grooves 132 on each side of the tracking groove 126, these grooves each shown as containing a V-type load and/or snubber belt 134. In this arrangement there could be two load belts and one snubber belt on each side of the tracking flange since no provision for a snubber belt is shown at the root of the tracking flange pulley groove. In order to provide a symmetrically balanced arrangement there are normally an equal number of load and snubber or tensioning belts on each side of the central tracking flange or pulley groove where tracking is employed.

The upper half of FIG. II further illustrates use of an endless tread belt 135 having outer lateral traction elements 136 formed thereon and a central inner tracking lip 137 engaged in the central tracking groove 126 to provide proper tracking of the tread belt. The lip 137 is formed with a continuous cavity 140 in which an axially relatively inelastic but bendable constraint belt or other similar element 142 is manually inserted so that its free ends may be connected by any suitable means, such as by riveting or by clamping means, as represented at 139, after the tread belt 135 has been installed on the hubless wheels 130. It should be noted that the neutral planes of the member 142 and the tread belt 135 are preferably coplanar and that, in the structure shown (see FIG. 11a), the lip 137 is formed with transverse slots 141 leaving spaced transverse protrusions or ribs 138, the slots communicating with the continuous cavity so as to provide convenient access opening through which the constraint member 140 may be inserted, tightened and secured. Such transverse slots also materially reduce the heat of internal friction resulting from bending forces being applied to the tread belt material.

The portion of FIG. 11 below the centerline 99 illustrates a hubless wheel 144 having inner support ribs 146, preferably formed opposite the V or other type load or snubber belt grooves 148, and the central tracking groove 116 opposite a heavier rib 149. Ribs 146 and 149 contribute rigidity and rolling circularity to hubless wheel 144, but this construction also permits hubless wheel 144 to flex and bend laterally as described in more detail below in reference to FIG. 14.

FIG. 12 is an enlarged fragmentary cross-sectional view, taken on a plane similar to that of FIG. 11, illustrating another hubless wheel construction. In this modification the hubless wheel 150 comprises a relatively thin-walled, convoluted, bellows-like cylinder having substantial capability of adapting itself to a terrain contour 152 as shown schematically in elevation in FIG. 14. This hubless wheel, if formed from metal or some material such as glass fibers and phenolic resin, may be coated on its external surface with an elastomeric tread 154 so as to be operable in an emergency without the tread belt 156 should this ever be necessary or desirable. Such a coating also contributes substantial abrasion resistance to the mechanical motions of the load and snubber belts as well as enhancing the effective friction, as required for propulsion and braking, developed through the load and snubber belts and the rolling contact between as well as enhancing the effective friction, as required for propulsion and braking, developed through the load and snubber belts and the rolling contact between the hubless wheels and the main load hub. The elastomer 154 may be mechanically anchored through openings 158 in the hubless wheel to facilitate retention thereof without total dependence upon adhesive bonding.

Such a convoluted structure also provides inherent pulley grooves 160 for the load and snubber belts. It also provides accommodations for a novel tread belt structure 156, which may have the usual external transverse traction elements 162 for engaging the road or other traversed surface 164, internal longitudinal ribs 166 spaced so as to be disposed between the hubless wheel convolutions to mechanically add to the lateral tracking stability of the tread belt and a hollow segmented constraint element 168 containing a relatively inelastic constraint cable 170 which, as already explained, is secured and tightened after the tread belt is in its installed position.

In the structures described thus far, FIGS. 1 and 2 for example, it will be noted that a load or snubber belt comprising an element of locomotion apparatus embodying the invention engages the pulley grooves in the main load hub and the hubless wheel elements on both its outer and inner periphery. Thus, where V-type load or snubber belts are employed, a double or back-to-back V-type belt 172 must be provided if the propulsion and/or braking forces developed are to be maximized. FIG. 15 illustrates such a V-belt 172 particularly adapted for such heavier duty applications, the belt being reinforced by one or more flexible but relatively inelastic high tensile strength elements 174, such as steel wire or polyester fibers, for example.

FIG. 16 illustrates another form of load or snubber belt 176 for heavier load applications, comprising a high tensile strength continuous or endless multiple loop flexible but relatively inelastic filament or wire 178 coated by any suitable method with elastomer 180. Such a belt might be made, for example, by winding a single strand of suitable filament 178 any desired number of times about a properly sized mandrel, without twisting or braiding, and then joining the two free ends thereof with an adhesive, as at 182, and then dipping, molding or otherwise imbedding such multiple loop endless filament in an elastomer to form a reinforced load or snubber belt of any desired tensile strength and cross-sectional shape.

The invention contemplates, as an important object, lateral pivotability of up to at least 30° in either direction, or up to 60° total in the hubless wheel locomotion apparatus, as shown schematically in FIG. 17. The specifically novel structure providing such pivotability is shown, by way of illustration, in FIGS. 24—27. In FIG. 17, for example, a vehicle includes a chassis 184, a power plant 186, a propeller shaft 188 driving a differential 190 supported by members 192 and driven axle assemblies 194 pivotally connected to and driving the main load hub 196 of a hubless wheel locomotion apparatus. With such an arrangement, the vehicle is capable of negotiating a curved or slope-sided gully or trench 198 or a crested ridge 200 (shown in dotted lines) with equal ease, while permitting the ground pressure to be substantially equalized throughout the entire footprint area of the tread belts and in no way detracting from vehicle lateral stability. In a similar environment, a conventionally tracked vehicle would run on the inner or the outer edges of its tracks, and this is one of the reasons that it is necessary to pretension such conventional tracks excessively, i.e., as much as 10,000 pounds per track initially in some vehicles.

Such a capability also total eliminates the need for "chevrons" or other similar antiskid configurations in the tread, which, in turn, substantially reduces the enormous forces, and consequent excessive wear rates, normally required for skid steering of conventionally tracked vehicles. For example, the wear rate for the track of a military vehicle such as the M—60 tank has been officially reported as in excess of two dollars per mile.

FIG. 18 illustrates a "digging in" capability, as at 202, of the pivotally mounted hubless wheel locomotion apparatus, with properly constrained tread belts, to hold a vehicle on moderately soft side slopes of up to one hundred percent throughout a broad range of soil compositions and moisture content, such a capability being obviously desirable for all offthe-road vehicles, civilian or military. Such a capability also provides better holding power while cornering without detracting from lateral stability.

FIG. 24 is an enlarged fragmentary perspective view of a portion of the axle assembly 194 shown in FIG. 17, certain portions thereof being removed to more clearly illustrate the structure shown and its relationship to the more complete structure shown in FIGS. 25—27. To the support member 192 is secured a vertically flexible "streamline" cross section (major horizontal and minor vertical axes) axle housing 204 having an axial passage 206 therethrough in which is disposed a tubular coil 208 formed from square or rectangular cross section wire of any suitable lubricant-impregnated porous bearing metal and a circular live axle 210 within the coil. The axle 210 is driven from the differential 190 at end 212 and has a squared opposite end 214, the sides of the square being equal to the diameter of the axle 210 in this particular example, and with the free end 216 thereof being semicircular in one plane. The coil 208 thus provides a flexible bearing for the axle 210 which is capable of flexing to some degree along with its housing 204. The "streamline" sectional configuration of the housing 204 helps to maximize angular displacement (lateral pivotability) of the cylindrically shaped main load hub 196.

The axle housing 204 is split at 218 all the way through vertically along that portion extending outwardly from support member 192 so that it is, in effect, a two-piece housing having a minimum vertical and a greater horizontal cross-sectional dimension, thus having horizontal rigidity and vertical flexibility.

Along each of the fore and aft edges of the outwardly extending portion of the axle housing 204 is welded a gusset plate 220 which progressively increases in height and terminates in an offset parallel circular portion 222 having a central opening 224 and spaced inner ribs 226. The two circular portions 222 are thus spaced and parallel to each other. The plates 220 are tapered toward the vehicle mounting so as to maximize lateral pivotability by eliminating, within design limits, any possible interference with the inside of the inner end of the main load hub, as shown schematically in FIG. 17.

FIG. 25 is a cross-sectional view through the pivot point 221 and along line 25—25 of FIG. 24, but of the entire pivotal axle assembly 194 disposed within the main load hub 196, as shown in FIG. 26. This assembly is best described by starting with the main body 228 comprising a substantially rectangular block having a circular passage 230 all the way therethrough and circular portions 231 at opposite sides thereof of substantially the same diameter as the circular portions 222 of the welded plates 220 and having internally threaded oppositely disposed bosses 232 accurately registering with the central openings 224 in the axle mounting plates 222. Circular elastomeric disk shock absorbing elements 234, having openings 236 receiving the bosses 232 and grooves 238 receiving the ribs 226, are adhesively mounted one on each of the circular portions 231, and this subassembly is slidably inserted between the circular plate portions 222 and secured by screws 240, which require impregnated bronze bearing inserts 241 to reduce the friction of angular motion.

The pivotal capability is provided by a block 244 formed internally with a rounded surface 246 to receive and mate with the rounded-in-one plane square free end 216 of the live axle 210 and permit movement thereof in one plane only, within the limits of the tapered sides 248 (FIG. 25) and oppositely rounded externally at the closed end 250 thereof to cooperate with the correspondingly radiused cavity 252 in the cylindrical member 254 and permit movement in a plane rotated 90°, within the limits of the sides 256 of the opening in member 254 (FIG. 26) and it is shown to be approximately 30° in either direction in this example.

The cylindrical member 254 is, of course, inserted into the opening 230, along with the lubricant sealing ring 258, bearing 260, bearing spacer 262 and block 244 before the live axle 210 is inserted through the axle housing 204 and into the block 244. The other bearing 264 and lubricant sealing ring 266 are then inserted from the opposite end opening 230, and the entire pivot mechanism is assembled on the central tubular projection 268 extending from the circular plate 270 having a peripheral flange 272 welded or otherwise secured to the inner periphery of the main load hub 196 (FIG. 26). The assembly is finally secured by a cap screw 274 passing through opening 276 in the main load hub mounting plate 270 and engaging in the threaded opening 278 in member 254.

The main load hub 196 and its coacting hubless wheel locomotion apparatus is thus able to pivot laterally, as shown schematically in FIG. 17, but is resiliently restrained by the resistance to distortion of the elastomer elements 234 from pivoting freely so that the greater the displacement angularly the greater will be the restoration force tending to return the apparatus to its normally horizontal position.

The structure shown by FIGS. 24—27 represents one pivotable drive structure for hubless wheel locomotion apparatus, one feature thereof being flexibility of the axle 210 and axle housing structure 204, between support member 192 and the gusset plates 220, providing further inherently flexible and resilient suspension characteristics in the vehicle, in addition to the inherent highly resilient and flexible suspension capability of the hubless wheel locomotion apparatus, per se. Such a noncircular, split, flexible axle housing 204 and the flexible, impregnated coil bearing 208 are also believed to be novel.

Figure 19:
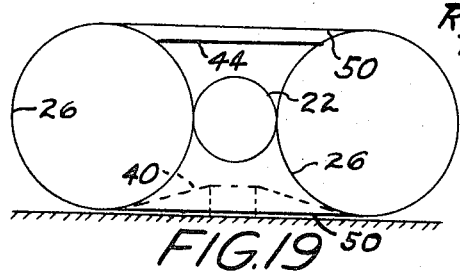
Figure 20:
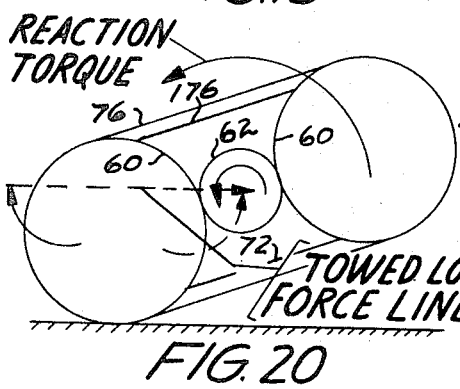
Figure 22:
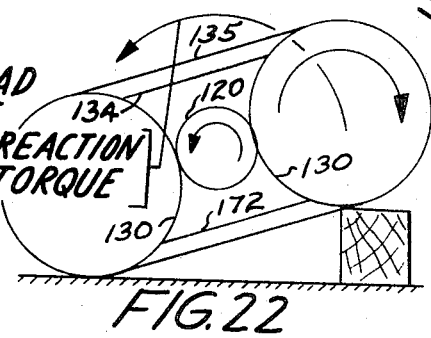

Before discussing the additional and somewhat special structural features of the invention, further capabilities of the hubless wheel locomotion apparatus thus far described will be very briefly explained. For example, when operating over a level, hard, nondepressible surface such as concrete and the like, as is usually the case, performance is much the same as for any tracked or tandem-wheeled vehicle, as shown in FIG. 19. If, however, the towed load is excessive and the friction coefficient between the hubless wheel apparatus and the surface over which it is being operated is at or above unity, then the front hubless wheel element can be made to lift completely free of the surface being negotiated, as shown in FIG. 20. This is possible only when the friction coefficient approaches unity, and it is this phenomenon which substantially reduces the amount of power required to negotiate obstacles, as shown in FIG. 22.

When operating over a soft depressible surface such as mud, sand, or snow and the like, the hubless wheel apparatus does not sink more at the front than at the rear as do conventionally tracked vehicles, which tend to bury themselves even more deeply because of their inherent tendency to transfer soil from the front to the rear (if moving forward). Instead, the apparatus of this invention tends to "climb out of its environment" because of its inherent dynamic-lift component (see FIG. 21) which is always exactly proportional to the amount of sinkage, and which will be dealt with in greater detail later. It is physically impossible for such apparatus to "worsen" its situation by the application of additional power, as contrasted with conventional wheeled or tracked vehicles which tend towards a "spin-in" stall.

Further, either end of vehicles having such locomotion apparatus embodying the invention can, even when excessively overloaded be made to ascent a vertical wall (see FIG. 23), with no discernible difficulty, until the vehicle topples over backwards. No other known vehicle construction, tracked or otherwise possesses this capability.

If the towed load is excessive and the traction good, existing wheeled tractor constructions are highly subject to rearward overturning, and many deaths have been attributed to this phenomenon. Under the same conditions, however, tractors driven by rear end hubless wheel apparatus, instead of lifting the front wheels, actually lift or tend to lift the rear end and increase the downward force through the front wheels so as to not only eliminate a very serious safety hazard, but to also enhance steering. It is well known that conventional wheeled tractors lose much or all of their steering capability when towing heavy loads, and this then requires that they be equipped with individually actuated rear or drive wheel brakes so as to partially compensate for the loss in the effectiveness of the steering. However, the application of either drive wheel brake can cause a loss of up to 50 percent or more in tractive draw bar pull so that the vehicle may become immobilized. With the apparatus of this invention, individually actuated right and left braking systems are not required.

Returning now to additional structural features, it will be recognized that under some terrain conditions it may be desirable to completely enclose the hubless wheel locomotion apparatus to seal the same against entry of foreign matter, particularly where the apparatus must operate in sand, dust, mud, and the like. Such sealing of prior art tracked vehicles is unheard of and virtually impossible due to the multiple point suspension systems used, and excessive maintenance and repair have been the inescapable consequence of this deficiency in conventional equipment.

FIG. 28 is a perspective view of a hubless wheel locomotion apparatus, such as that shown in FIG. 17, illustrating, in the same view, two alternate novel means for completely enclosing or sealing the same, one such means being shown on each side of the broken line 280.

The means illustrated by the somewhat larger portion of the apparatus shown to the right of the line 280 comprises a pair of initially circular and substantially identical tread belt halves 282 and 284 having a circumference such that they can be assembled, as by stretching, on the periphery of a hubless wheel locomotion apparatus, as partially shown in FIG. 29, each tread belt half enclosing only one longitudinal half of the width of the apparatus. It will be noted that each of the essentially identical tread belt halves 282 and 284 has an integral wall 286 closing one end thereof, the wall 286 for tread belt half 282 not being seen, of course, in the perspective view of FIG. 28. Each such circular tread belt half 282 and 284 and its integral closure portion 286 is constructed from a highly resilient and highly elastic material. The closure portion may be formed from the the same material as the tread belt halves 282/284 so as to be continuous therewith, or bonded or otherwise secured thereto. The closure 286 of tread belt 284 is formed with a central opening 288 fitted with a rigid sliding gasket arrangement 290 to provide a gas-tight seal with the axle housing, as conventionally practiced with pivotable air and steam lines. The closed end of the other tread belt 282 is, of course, free of any openings, since nothing extends from the side of the apparatus opposite the axle housing 292. However, in those cases where an axle does extend from the other side of the apparatus, a similarly sealed opening would be provided in closure 286 of tread belt 282.

In assembly it is necessary to stretch the circular tread belt half 284 having the opening 288 in the closure side over one longitudinal half of the apparatus prior to installation of the axle housing 292, and the other tread belt half 282 over the other half of the apparatus so that their parallel edges 293 at the open sides thereof meet in or near the center of the apparatus along the line 294 in FIGS. 28—30.

FIGS. 29 and 30 are enlarged fragmentary cross-sectional and plain views, respectively, illustrating how adjacent edges 293 of the tread belt halves 282/284 of FIG. 28 are secured to prevent their separation in use. As shown, these edges of the belt halves are formed with a row of open, generally square or rectangular depressions 296, the separating walls 298 of which are aligned in assembly of the belts and which together form a tread belt tracking alignment lip 300 received in the central tracking groove 302 in the hubless wheel element 304. While the lip 300 might suffice, means such as a channel clip 306, having punched-out biting elements 307 (shown in perspective in FIG. 32), may be clamped on the transversely aligned walls forming the depressions 296, with the longitudinal walls 298 cleared by the openings 297, as shown in FIGS. 29 and 30.

Shielding of the joint 294 and additional mechanical retention is provided by stretching into place a third endless central tread belt 308 having on its underside two rows of aligned spaced blocks 310 shaped to fill the depressions 296. It will be noted that the top of the walls 298 forming the depressions 296 are positioned below the outer running surfaces of the main tread belt halves 282/284 to provide a channel cavity sufficient to receive the continuous portion of the central tread belt 308. The walls 298 are, of course, received in the spaces 312 between the blocks 310.

As the tread belt halves 282/284 move on the road or other surface, the elastic side sealing walls 286 also rotate about the axle housing 292 and flex as required, as represented by the generally radially extending lines 311. It should be noted that the elongation forces are always completely neutralized at the sliding gasket seal at opening 288. Such tread belt halves, 282/284, with their integral side closures 286 made from very soft, low Durometer elastomers would, of course, be particularly suited for low capacity applications of the apparatus.

FIGS. 33—36 illustrate the method of sealing shown in perspective to the left of the broken line 280 in FIG. 29, it being understood, of course, that in a particular apparatus one method or the other would be employed not both. In this configuration, a separate single tread belt 316 is employed, the belt being slightly wider than the apparatus so that the rows of circular openings 318, having smaller diameter portions 320 terminating at an endless groove 322 extending around the inner periphery of each edge of the belt, are disposed slightly beyond the ends of the hubless wheel elements on which the belt 316 is fitted, as shown by the dotted line 324 in FIG. 34.

In this particular application, used primarily in heavy duty operations where the tread belt 316 must be tougher and harder, i.e., of substantially higher Durometer than the much softer side closure elements 326, provision such as 300/302 for central tracking or guidance of the tread belt may be omitted. Instead, the tracking function may be performed exclusively by the side closure elements 326, which are formed from a soft, highly resilient and elastic low Durometer elastomer similar to the 282/284 materials. Elements 326 are formed to be circular initially, although they become substantially elongated when installed.

Of course, one of the two sealing elements 326 has a central opening arrangement for the axle housing 292, similar to arrangement 288/290, the other being continuous or imperforate, as previously explained. The elements 326 have a tapered keystone bead 328 around the outer periphery thereof, conforming to the slope of the groove 322 and from which the plugs 330 having reduced diameter portions and conical tips 334 extend generally radially.

In this second construction, the tread belt 316, which may also include constraint structure such as that described in connection with FIGS. 11 and 12, is first assembled on the hubless wheel apparatus, as previously described, and the elements 326 are assembled with the bead 328 in the groove 322 as the plugs 330 are manually pulled through the openings 318, as shown in FIGS. 28 and 35. Here, again, the sealing side wall closures 326 flex as they rotate with the tread belt 316, and, as shown in FIG. 28, the closures 286 and 326 may be fitted with a pnumatic tire or other type valve 314 so that the sealed tread belt may be inflated to maintain the closures away from internal moving elements of the apparatus and prevent excessive wear thereof. Where airtight sealing is required, all joints can be sealed with means such as a cement or a pressure sensitive adhesive.

OPERATION

Having described the structure of preferred and other embodiments of the invention, and in order to further enhance a full and clear understanding thereof, the operation and some of the salient functional attributes of the invention will now be described, making reference to the drawings, wherever necessary to identify the specific structure responsible for such desirable novel functional features.

In the apparatus illustrated by FIGS. 1—3, the weight of the truck 16 is transferred through the members 18 to the main load hub 22 and thence to the load belt 40, which wraps on about 75 percent of the circumference of the hubless wheels 26, at the load belt grooves 36, thus applying what is termed herein as a circumferential load on the hubless wheels.

Where the apparatus is not self-propelled, as would normally be the case in an industrial caster 10, but the vehicle 16, is merely pushed or towed, internal friction as a necessary function of propulsion is not a factor. Rather, the towing or pushing force merely overcomes the rolling friction within the apparatus and the external rolling resistance between the apparatus and the surface over which it moves. The snubber belts 44, which are not taught at all in my prior patent, merely hold the coacting elements of the apparatus together, as is also true in the case of the apparatus shown by FIGS. 6—8 and particularly desirable where no tread belt is employed.

However, if apparatus such as a caster 10 is self-propelled by driving the main load hub 22, as illustrated schematically in FIGS. 7 and 17, then rotation of the load hub 22 drives the hubless wheels 26 by rolling friction between the load hub and the hubless wheel elements, which increases with the load 42, and the circumferential load-induced friction of the load belt 40, and/or the snubber or tensioning belts 44, as previously explained. That is, while the primary purpose of the snubber belts is to retain the elements in the assembled condition, by virtue of their bottom runs 46 passing over the top of the main load hub 22, they are also essentially additional propulsion or power transmitting elements and should be so employed.

There must always be at least one snubber belt, and this could be positioned in a central pulley groove in the main load hub central tracking flange and in the root of the central tracking groove of the hubless wheels, as in groove 118 in FIG. 10 and groove 117 in FIG. 11, for example. In that event, the remaining belts would generally all be load belts, although mixed load and snubber belts, with an equal number of each on each side of the central tracking flange to provide good mechanical symmetry, would be preferred where the additional propulsion or braking offered by the extra snubber belts is desired.

It should be noted that the hub is compressively wedged between two hubless wheels to provide two areas of rolling friction, each contributing substantially to the total internal drive friction which can be developed in self-propelled applications.

Where a tread belt is employed in a self-propelled apparatus, the total friction between the hubless wheels and the inner surface of the endless tread belt is generally always greater than the friction between the tread belt and the road or terrain over which the vehicle is traveling. In the preferred construction, hubless wheels with a bonded or suitably anchored elastomeric outer surface (FIG. 12, for example) are employed with an elastomeric tread belt, and the friction therebetween is more than adequate to prevent slipping of the hubless wheels within the tread belt under high loads. Further, the enormous contact area resulting from the full 180°-wraparound of the tread belt on each hubless wheel element enhances the frictional forces, it being noted that the tread belt wrap is never less than 180°and can be more. It should be noted that both hubless wheel elements are independently powered with the result that the tread belt transmits no belt power, per se. It should be further noted that the traction-generating element, the tread belt, is totally divorced from the basic load supporting elements, thus permitting the use of a simple, low-cost, easily field replaceable tread element, which will obviously be the first component to wear as the result of roadway abrasion. The tread belts may or may not be fabric reinforced as performance requirements dictate.

As shown by FIG. 9, where high propulsive or braking loads will be encountered, means may be provided for augmentation tensioning of the snubber belts to increase the internal frictional drive capabilities, as, for example, in applications to enormous cargo aircraft such as the C5A. Further, in large, high load applications, load hubs and hubless wheels may be lagged with an elastomeric coating, as previously stated, to enhance the internal friction generating properties.

Referring again to the drawings and the Detailed Description, it will be noted that apparatus 10 (FIGS. 1—5) and apparatus 54 (FIGS. 6—8) are described as assemblies, either towed or self-propelled. FIGS. 17, 18 and 24—27 illustrate a vehicle having laterally pivotable apparatus and a means by which such pivotability may be provided whether or not the vehicle is towed or self-propelled. Other FIGS. and description relate to modifications of various elements and/or combinations of elements, such as load or snubber belts, load hubs, hubless wheels, tread belts, sealing means, and the like. It should be clearly understood that the various configurations of the elements shown and described are intended to be employed, without limitation, in combination with any other compatible element or elements in providing apparatus for any desired application. This is clearly shown, for example, by the reference numerals applied to the various elements of FIGS. 9 and 19—23, such application of reference numerals being only illustrative of the interchangeability of elements and not limited to the specific combinations indicated.

The improved apparatus disclosed in various forms herein provides a fully integrated vehicle suspension and surface locomotion apparatus applicable to any type of vehicle, powered or unpowered, conventionally tracked or wheeled, from a vehicle such as a hand-operated wheelbarrow to self-propelled vehicles of all kinds, including aircraft. As previously explained, the suspension spring rate is initially low and inherently self-compensating for load and/or impact variations so that the rate may rapidly increase, is highly desirable for heavy-duty industrial equipment such as fork trucks and the like which are presently not shock or spring mounted.

Figure 21:
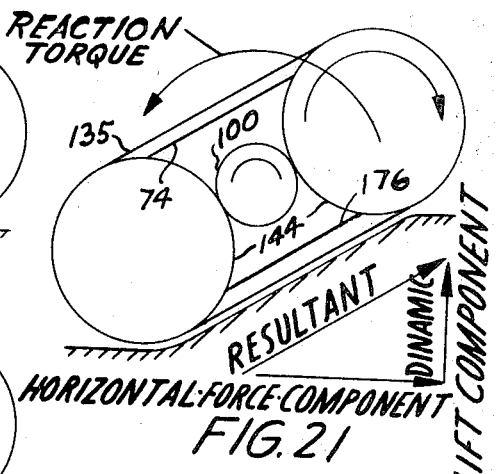
Figure 23:
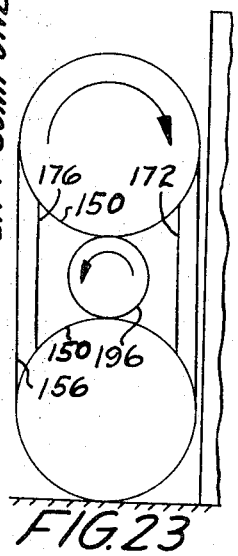

Apparatus embodying the invention automatically differentiates between hard and soft terrain, as described in connection with FIGS. 19—21, and functions as a track only when required to negotiate rough or soft terrain, which is normally a small percentage of the time that most vehicles operate. For example, where the load belt or belts are recessed from the outer peripheries of the hubless wheels, the hubless wheels must sink into the terrain before the belts function as a track, at which time the load belts may be tensioned further to increase their propulsion, this being true whether or not a tread belt is employed. However, where a tread belt is employed, sinking causes the deformable tread belt to engage the relatively inelastic load belt or belts and resist further sinking. Such inherent ability to perform well at high speeds as a wheeled vehicle when operating on a hard surface substantially eliminates the normal wear and tear encountered with the tracks of conventionally tracked vehicles.

Another feature of the invention is that the load hub diameter is usually substantially less than the diameter of the conventional wheel that the apparatus replaces, thus providing an inherent "gear down" in the propulsion apparatus, and thereby reducing the gear down required in the drive mechanism in self-propelled applications.

Dynamic lift capability has been stressed as one of the important functional features of the apparatus, and further discussion thereof may be worthwhile. First, while dynamic lift or planing is present in unpowered applications of the apparatus, maximum dynamic lift is developed in self-propelled apparatus under substantial power, and the basic structure disclosed in my prior patent is lacking or deficient in this respect in that it completely lacks the snubber belts feature. That is, while my prior patent disclosure has inherent potential for dynamic lift or planing effect capability, it has no reaction snubbing and depends solely upon gravitational forces to maintain maximum internal friction; thus, the application of substantial self-propulsion power could cause the main load hub to slip in relation to the hubless wheels, and this would not provide sufficient reaction torque to fully develop the dynamic lift force components shown by FIGS. 21—23.

Dynamic lift eliminates the characteristic "bulldozing" and "spin-in" stalls of conventional tracked or wheeled vehicles, enables acceleration from a dead stop up 100 percent or greater slopes, permits the climbing of vertical walls, prevents rearward overturning and improves the front wheel steering capabilities of vehicles having apparatus as the rear end drive, reduces power consumption and power-available requirements of many vehicles, provides a drastic reduction in effective footprint area required for a given set of load and terrain conditions and reduces soil scarification and attendant tread belt wear.

Except for ground effects or air cushion vehicles, there is presently no self-powered land or amphibious vehicle in use having any form of the dynamic lift phenomenon i.e., wherein the effective thrust component is horizontal only when operating over a level nondepressible surface, vertical when climbing a vertical wall, and at some resultant angle between the horizontal and vertical extremes, depending upon the amount of sinkage, when operating over soft depressible surfaces. Thus, instead of consuming a major portion of its delivered power in bulldozing, a heavy vehicle propelled by apparatus having dynamic lift can successfully traverse depressible terrain with much less power or torque multiplication, thereby enabling reduction in size and weight of the power train and the propulsion apparatus, which further reduces the delivered power-torque requirements and/or increases the payload.

It should also be noted that, contrary to existing theories advocating long and narrow tracks to minimize trail-breaking and soil-compaction energy losses, this apparatus is characterized by a shorter and wider track to substantially reduce the forces required for skid steering and its consequent abnormal wear, and with dynamic lift the soil compaction losses, per se, largely disappear. This construction permits an increase in footprint area without any weight penalty, along with a substantial reduction in basic vehicle weight. In general, the larger the footprint, the less the vehicle will weigh, which is exactly opposite from conventionally tracked vehicles.

It has previously been mentioned that rear drive apparatus equipped vehicles do not have the tendency for rearward overturning and have better front wheel steering; this is because such vehicles have a substantially constant center of gravity. The tread belt constraint member prevents tread belt detracking, even when the fore and aft hubless wheel elements are 45° out of plane (FIG. 4, for example) with each other, an extremely unlikely condition, and the tread belt requires no adjustment; this is in contrast to conventional tracked vehicles which present the major problem of excessive track tension and rigidity initially, and constant readjustment of massive reinforced track elements.

In allowing use of unsupported elastomer tread belts, as shown in FIGS. 11, 12 and 29, the apparatus reduces bending energy, internal heat developed and retained, initial cost, and it permits use of more durable polyurethane materials in substantially thinner sections.

Further, apparatus embodying the invention inherently requires less power because the rolling resistance developed thereby on a smooth, nondepeessible surface has been shown to be on the order of 20 pounds per ton, as contrasted with values of over seven times that much for other known forms of tracked surface locomotion. This difference becomes even more pronounced for operation over rough or depressible terrain. Also, as compared to conventional tracked vehicles apparatus-equipped vehicles generate negligible noise and vibration, and noise telegraphy is relatively nonexistent. In addition, sealed apparatus (FIG. 28) may provide sufficient displacement for amphibious vehicle applications without any form of additional flotation.

The invention, including various embodiments thereof, has been described in such clear and concise terms as to enable anyone skilled in the art to practice the same. It is recognized, however, that other modifications may be made within the scope of the invention; thus, the disclosures and description herein are illustrative and not intended to be in any sense limiting.

I Claim:

1. An integrated load suspension and surface locomotion apparatus for use with an associated vehicle, comprising at least first and second spaced surface locomotion wheels, endless load belt means circumferentially engaging said surface locomotion wheels and including upper and lower load belt run portions extending between said surface locomotion wheels, first rotatable vehicle weight load input means engaging at least one of said run portions so as to cause said one run portion to be deflected toward the other of said run portions, said endless load belts means said first rotatable input means and said first and second surface locomotion wheels being held in rolling engagement primarily by virtue of the force of said vehicle weight load with each of said first and second wheels being movable independently of the other, said endless load belt means being effective to circumferentially apply to said first and second surface locomotion wheels a first loading force generally radially directed with respect to said surface locomotion wheels of a magnitude reflective of the magnitude of said vehicle weight load applied by said first rotatable weight load input means to said endless load belt means independent of the weight of said load belt means, and tensioning means operatively engaging said first rotatable vehicle weight load input means and effective for creating a force augmenting the force of said vehicle weight load against said endless load belt means and of a magnitude independent of the attitude collectively assumed by said first and second surface locomotion wheels relative to said associated vehicles, said endless load belt means being effective to circumferentially apply to said first and second surface locomotion wheels a second loading force generally radially directed with respect to said surface locomotion wheels of a magnitude reflective of the magnitude of said augmenting force created by said tensioning means, said tensioning means being further effective for maintaining said endless load belt means said first rotatable input means and said first and second surface locomotion wheels in said rolling engagement whenever said vehicle weight load is removed from said first rotatable load input means as when upward acceleration is imparted to said associated vehicle.

2. An integrated load-suspension and surface locomotion apparatus according to claim 1 wherein said first and second surface locomotion wheels are circular and are formed of material permitting said locomotion wheels to be elastically deformable out of circularity.

3. An integrated load-suspension and surface locomotion apparatus according to claim 1, wherein said first and second surface locomotion wheels are formed as hollow cylinders from material permitting said wheels to be elastically deformable under load or impact in order that transverse sections thereof normal to the cylindrical axis may deform out of concentricity.

4. An integrated load-suspension and surface locomotion apparatus according to claim 1, including flotation means carried by said first and second surface locomotion wheels for increasing the buoyancy of said apparatus for locomotion through water.

5. An integrated load-suspension and surface locomotion apparatus according to claim 1, wherein said endless load belt means and said tensioning means are at least in part elastically deformable.

6. An integrated load-suspension and surface locomotion apparatus according to claim 1, including means for drivably rotating said first rotatable load input means in order to thereby impart driving rotational torque to said surface locomotion wheels and propel said apparatus.

7. An integrated load-suspension and surface locomotion apparatus according to claim 1, wherein at least one of said surface locomotion wheels is of a generally cylindrical configuration and including convoluted wall sections when viewed in axial cross section, said convoluted wall sections permitting said cylindrical wheel to undergo axial flexibility in order to conform to variations in contour of the surface being transversed.

8. An integrated load-suspension and surface locomotion apparatus according to claim 1, including endless tread means circumferentially carried by said surface locomotion wheels for engaging the surface supporting said apparatus.

9. An integrated load-suspension and surface locomotion apparatus according to claim 8, wherein said endless tread means comprises a plurality of endless tread means spaced from each other axially of said surface locomotion wheels.

10. An integrated load-suspension and surface locomotion apparatus according to claim 8, wherein said tread means comprises endless tread belt means including tracking means effective for operatively engaging said first and second surface locomotion wheels and maintaining said endless tread belt means in tracking alignment with said surface locomotion wheels during locomotion of said apparatus.

11. An integrated load-suspension and surface locomotion apparatus according to claim 1, including tracking alignment means formed on at least said first and second surface locomotion wheels and operatively engaging said first rotatable load input means for assuring said first and second surface locomotion wheels to maintain rolling tracking alignment with respect to each other.

12. An integrated load-suspension and surface locomotion apparatus according to claim 11, including endless tread belt means carrying second tread belt tracking means, said tread belt tracking means operatively engaging said tracking alignment means for assuring said first and second surface locomotion wheels and said endless tread belt means to maintain rolling tracking alignment with each other.

13. An integrated load-suspension and surface locomotion apparatus according to claim 1, including articulating means operatively connected to said first rotatable load input means and positioned as to be interposed generally between said first rotatable load input means and said associated vehicle, said articulating means permitting said first and second surface locomotion wheels and said first rotatable load input means to assume inclined attitudes transversely of said associated vehicle in order to thereby follow the surface contour of the surface being transversed by said first and second surface locomotion wheels.

14. An integrated load-suspension and surface locomotion apparatus according to claim 13, wherein said articulating means comprises an elongated housing having a first end for mounting connection to said associated vehicle, a second end adapted for connection through interposed jointed means to said first load input means, said jointed means permitting said surface locomotion wheels to assume said inclined attitudes both above and below the normal horizontal.

15. An integrated load-suspension and surface locomotion apparatus according to claim 1, wherein said tensioning means comprises second endless belt means operatively circumferentially engaging said first and second surface locomotion wheels and said first rotatable load input means, said second endless belt means being so wound about said first rotatable load input means as to be disposed on a side of said first rotatable load input means opposite to that engaged by said one run portion of said endless load belt means.

16. An integrated load-suspension and surface locomotion apparatus according to claim 15, wherein said second endless belt means is formed of a relatively resilient and elastic material, said second endless belt means being effective to urge said first rotatable load input means into operative engagement with said endless load belt means with a force increasing in magnitude in accordance with increasing elastic deformation of said second endless belt means.

17. An integrated load-suspension and surface locomotion apparatus according to claim 15, including at least one of said second endless belt means and a plurality of said endless load belt means, said plurality of endless load belt means being spaced from each other and on opposite sides of said second endless belt means.

18. An integrated load-suspension and surface locomotion apparatus according to claim 15, including at least one of said endless load belt means and a plurality of said second endless belt means, said plurality of said second endless belt means being spaced from each other and on opposite sides of said endless load belt means.

19. An integrated load-suspension and surface locomotion apparatus according to claim 15, wherein said endless load belt means comprises a multiturn endless loop of high tensile strength filament covered with an elastomer.

20. An integrated load-suspension and surface locomotion apparatus according to claim 15, wherein the extent of wrap of said endless load belt means on said each of said first and second surface locomotion wheels is in the order of approximately 270° so that approximately 90° of each of the peripheries of said surface locomotion wheels is unsupported by said endless load belt means thereby permitting elastic distortion of said surface locomotion wheels and imparting thereto a degree of resilience to the suspension characteristics of said surface locomotion wheels.

21. An integrated load-suspension and surface locomotion apparatus according to claim 1, wherein said first rotatable load input means comprises a first load roller member, wherein said first surface locomotion wheel comprises a first surface locomotion roller, wherein said second surface locomotion wheel comprises a second surface locomotion roller, and wherein said tensioning means comprises second endless belt means operatively circumferentially engaging said first and second surface locomotion rollers and said first load roller, said second endless belt means being so wound about said first load roller as to be disposed on a side of said first load roller opposite to that engaged by said one run of said endless load belt means.

22. An integrated load-suspension and surface locomotion apparatus according to claim 21, including a plurality of grooves formed in and circumferentially about said first and second surface locomotion rollers, said grooves being effective to constrain movement of said endless load belt means and said second endless belt means axially of said surface locomotion rollers.

23. An integrated load-suspension and surface locomotion apparatus according to claim 21, wherein said first and second surface locomotion rollers are each relatively thin-walled hollow cylinders in direct rolling contact at the outer peripheral surfaces thereof with the outer peripheral surface of said first load roller.

24. An integrated load-suspension and surface locomotion apparatus according to claim 21, wherein said first load roller said first surface locomotion roller and said second surface locomotion roller are formed to provide self-tracking means, said self-tracking means comprising an annular circumferentially extending flange formed on certain of said rollers and a cooperating annular circumferentially extending groove formed at least in an other of said rollers and located axially thereof so as to rollingly receive a portion of said annular flange therein.

25. An integrated load-suspension and surface locomotion apparatus according to claim 21, wherein said first load roller and said first and second surface locomotion rollers are each formed at the outer peripheries thereof with at least two annular grooves, each groove in each roller being aligned with a correspondingly positioned groove in each of the other os said rollers, wherein said endless load belt means comprises first and second endless load belts, and wherein one of said endless load belts is disposed in each set of aligned grooves.

26. An integrated load-suspension and surface locomotion apparatus according to claim 25, wherein each of said annular grooves include a ring-like annular insert, said insert having its outer periphery of a configuration the contour of which compliments the contour of the mating surface of said belts.

27. An integrated load-suspension and surface locomotion apparatus according to claim 21, wherein said first load roller operatively engages a first run of said second endless belt means, and wherein additional tnesioning means are provided for operatively engaging and forcibly deflecting a second run of said second endless belt means to thereby further increase the magnitude of said augmenting force.

28. An integrated load-suspension and surface locomotion apparatus according to claim 27, wherein said additional tensioning means comprises additional roller means operatively connected to said first load roller and rollingly engaging said second run of said second endless belt means.

29. An integrated load-suspension and surface locomotion apparatus according to claim 28, wherein said first load roller and said additional roller means are operatively connected by additional endless belt means, said additional endless belt means being effective to urge said first load roller and said additional roller means toward each other and thereby correspondingly urge said fist run and said second run of said second endless belt means toward each other.

30. An integrated load-suspension and surface locomotion apparatus according to claim 21, including an endless tread belt, said tread belt being fitted over said first and second surface locomotion rollers so as to be in engagement therewith and providing upper and lower tread belt run portion generally bridging the space between said first and second surface locomotion rollers.

31. An integrated load-suspension and surface locomotion apparatus according to claim 30, wherein each of said first and second surface locomotion rollers has a circumferentially extending annular groove formed in the outer periphery thereof, each of said annular grooves being respectively situated axially of said surface locomotion rollers as to be generally coplanar with each other, wherein said tread belt includes an inner disposed surface provided with an inwardly directed continuous lip, said annular grooves being adapted to receive said lip therein so as to thereby restrict motion of said tread belt axially of said surface locomotion rollers.

32. An integrated load-suspension and surface locomotion apparatus according to claim 31, wherein said lip is formed with a continuous internal passage running lengthwise therethrough and having disposed therein an elongated bendable constraint member, said elongated bendable constraint member including free ends which are securely connected to each other in order to tighten and anchor said lip in said annular grooves, said tread belt including at least one access aperture communicating with said passage for enabling insertion of said elongated constraint member as well as the tightening of said free ends.

PO-1050
(5/69)

UNITED STATES PATENT OFFICE
CERTIFICATE OF CORRECTION

Patent No. 3,533,482          Dated October 13, 1970

Inventor(s) WALTON W. CUSHMAN

It is certified that error appears in the above-identified patent and that said Letters Patent are hereby corrected as shown below:

Column 6, at line 21, "rididity" should be changed to --- rigidity ---.
Column 7, lines 70, 71 and 72, delete, "as well as enhancing the effective friction, as required for propulsion and braking, developed through the load and snubber belts and the rolling contact between".
Column 8, line 61, change "total" to read --- totally ---.
Column 10, line 60, change "ascent" to read --- ascend ---.
Column 12, line 56, "pnumatic" should be --- pneumatic ---.
Column 14, line 28, after the comma (,) and immediately before "is" insert --- as ---.
Column 15, line 52, change "non-depeessible" to --- non-depressible ---.
Column 16, line 7, "belts" should be --- belt ---.
Column 16, line 10, delete numeral "41".
Column 16, line 24, "vehicles" should be --- vehicle ---.
Claim 7, line 8, "transversed" should be --- traversed ---.
Claim 13, line 10, "transversed" should be --- traversed ---.
Claim 30, line 5, "portion" should be --- portions ---.

(Since the line numbers in the patent are wrong in that there are not 75 lines per column, the above line numbers are the actual lines as counted from the top of the column or the beginning of the claim, as the case may be.)

SIGNED AND
SEALED
MAR 16 1971

(SEAL)
Attest:

Edward M. Fletcher, Jr.
Attesting Officer

WILLIAM E. SCHUYLER, JR.
Commissioner of Patents